United States Patent [19]

Juergensen

[11] 4,453,180
[45] Jun. 5, 1984

[54] LIGHT PICK-UP DEVICE

[75] Inventor: Heinrich Juergensen, Raisdorf, Fed. Rep. of Germany

[73] Assignee: Dr. Ing. Rudolf Hell GmbH, Fed. Rep. of Germany

[21] Appl. No.: 375,005

[22] Filed: May 5, 1982

[30] Foreign Application Priority Data

May 9, 1981 [DE] Fed. Rep. of Germany ........ 3118459

[51] Int. Cl.³ .............................................. H04N 1/46
[52] U.S. Cl. ..................................... 358/75; 250/228; 358/293; 358/294
[58] Field of Search .................. 358/294, 293, 75, 80; 250/228

[56] References Cited

U.S. PATENT DOCUMENTS

| 1,970,312 | 8/1934 | Ives | 358/294 |
|---|---|---|---|
| 3,603,730 | 9/1971 | Weigl et al. | 358/294 |
| 3,781,464 | 12/1973 | Bousky | 358/53 |
| 4,038,554 | 7/1977 | Craig | 250/572 |
| 4,080,634 | 3/1978 | Schrieber | 358/298 |
| 4,314,283 | 2/1982 | Kramer | 358/294 |
| 4,321,630 | 3/1982 | Kramer | 358/294 |
| 4,346,295 | 8/1982 | Tanaka et al. | 250/327.2 |
| 4,360,268 | 11/1982 | Zucker | 250/228 |
| 4,371,897 | 2/1983 | Kramer | 358/75 |

FOREIGN PATENT DOCUMENTS

| 482842 | 9/1929 | Fed. Rep. of Germany . |
|---|---|---|
| 1102207 | 3/1961 | Fed. Rep. of Germany . |
| 2605156 | 8/1976 | Fed. Rep. of Germany . |
| 2850701 | 5/1979 | Fed. Rep. of Germany . |
| 2301140 | 9/1976 | France . |
| 1308047 | 2/1973 | United Kingdom . |
| 1526760 | 9/1978 | United Kingdom . |

OTHER PUBLICATIONS

Cronquist, "Hollow Reflecting Light Collector Tube", *IBM Technical Disclosure Bulletin*, vol. 17, No. 3, Aug. 1974, pp. 906–908.

*Primary Examiner*—Howard W. Britton
*Attorney, Agent, or Firm*—Hill, Van Santen, Steadman & Simpson

[57] ABSTRACT

A light pick-up device for transparency and/or opaque scanning in a drum or flat bed scanning device consisting of a hollow body which has a light entry opening and at least one opening forming the light pick-up surface. That part of the inside surface which is opposite the light pick-up surface is a diffusedly reflecting reflector and the remaining part may be a mirror or also a diffusedly reflecting reflector. The light modulated from the master is collected in the light pick-up device, is reflected into the light pick-up surface, and is conducted from there to an opto-electronic transducer means which generates the image signal. Since the device suppresses the disruptive influence of scratches and shadow edges in the master, a high efficiency and high uniformity of the scanning are achieved with the light pick-up device.

30 Claims, 7 Drawing Figures dichroitic filter opto-electronic Transducer

LIGHT PICK-UP DEVICE

BACKGROUND OF THE INVENTION

1. Field of the Invention

The invention relates to a light pick-up device of an opto-electronic scanning element for either transparent or opaque masters for either flat bed or drum scanning devices.

2. Prior Art

Flat bed or drum scanning devices are employed, for example, in facsimile transfer technoloy. A light beam scans the master or original, which is to be reproduced, point-wise and line-wise. The scanning light coming from the master or original strikes an opto-electronic scanning element which converts the light into an image signal. The image signal is forwarded over a transmission channel to a facsimile recording device which will record a reproduction of the master.

The masters to be reproduced may be either type masters, rastered or unrastered image masters or masters which are assembled of both type and images, and are so-called paste-up montages.

In a flat bed scanning device in which a light beam is deflected along a line of a given length, the opto-electronic scanning element is designed in such a manner that its light pick-up surface extends at least over the given line length so that approximately the same pick-up condition for the modulated light coming from the master prevails in every position of the deflected light beam.

The opto-electronic scanning element can consist of a row of photodiodes in the form of a photodiode strip which is disposed in the light pick-up surface. However, the scanning element can also be an optical shape converter, which is constructed of a multitude of optical fibers and a discrete opto-electronic transducer, for example, a photomultiplier. In this arrangement the surface of the optical shape converter with the greater expanse forms the light pick-up surface and the discrete opto-electronic transducer is coupled to the surface with the smaller expanse.

As a result of scratches in the master and as a result of so-called shadow edges in the case of a master which is a paste-up montage, the scanning light is diffusely reflected from the master with an asymmetrical intensity distribution and scanning errors will occur.

A flat bed scanning device with a scanning element for an opaque original or master is already known and is described in U.S. Pat. No. 4,080,634, whose disclosure is incorporated by reference thereto. The scanning element of this patent has a light pick-up device which, in order to reduce the aforementioned scanning errors, collects the modulated light which is reflected from the opaque master and supplies it to a photodiode strip.

The known light pick-up device, which extends over the line length, has light openings, which are oriented in the line direction on the side facing away from the master and on the side facing the master the device has a reflector for deflecting or reflecting the modulated light onto the light opening. The inside space of the light pick-up device is mirrored and has an elliptical cross-section on a plane which is perpendicular to the line direction. The light pick-up device is disposed in such a manner that the one focus line of the ellipse coincides with the point of incidence of the scanning light beam on the master. The modulated light reflected by the master is reflected by the mirrored inside surface into the other focus line of the ellipse on which the light pick-up surface of the photodiode strip is situated.

This known light pick-up device has the disadvantage that such a photodiode strip is relatively insensitive and slow, and therefore only a low scanning rate can be achieved. A higher or faster scanning rate could be achieved, for example, by employing faster photomultipliers. The disposition of a multitude of photomultipliers instead of the photodiode strip would be difficult in the known light pick-up device and would hardly be possible for reasons of space requirements. In the known light pick-up device, even the attempted use of an optical shape converter instead of the photodiode strip would have considerable disadvantages and problems. Since the angle at which an optical fiber of the optical shape converter can pick up light is significantly smaller than the angle at which a photodiode strip can pick up light, only a small part of the mirrored inside surface would be actively used in the known light pick-up device. Thus the modification of using the converter for the photodiode strip would reduce the sensitivity and uniformity of the scanning.

A further disadvantage is that the known light pick-up device is only suitable for scanning opaque masters in a flat bed scanning device and is not suitable for transparency masters and for use in a drum scanning device.

SUMMARY OF THE INVENTION

In order to avoid these disadvantages, it is an object of the present invention to provide a light pick-up device which has a high scanning rate for use in both transparency and/or opaque scanning. It is also an object to provide a device which at the same time has a high sensitivity and uniformity of the scanning and which is suitable both for drum as well as for flat bed scanning devices.

To accomplish these objects, the present invention is directed to an improvement in a light pick-up device for point-by-point and line-by-line opto-electrical scanning of a master or original, said device having means for projecting a scanning light beam on the master which modulates the beam to form modulated light and means for sensing the modulated light and converting it into image signals including a hollow body with a light entrance opening facing the master for receiving the modulated light, said hollow body having an inside reflective surface with a light pick-up surface portion to pick up the modulated light which is reflected by the reflective surface onto the pick-up surface. The improvements comprises the light pick-up surface portion of the hollow body being formed by at least one light pick-up opening having an aperture angle, the reflective surface of the hollow body lying opposite the light pick-up opening at least in the area covered by the aperture angle being a diffusedly reflecting first reflector and the reflective surface adjacent the light pick-up opening being a second reflector, said first and second reflectors being disposed relative to one another in such a manner that the incident light on either one of the first and second reflectors is reflected towards the other reflector disposed opposite thereof, said first reflector being shaped in such a manner and being aligned relative to the light pick-up openings so that a large portion of the modulated light is reflected by the first reflector onto the light pick-up openings and the light entrance opening is shaped in such a manner and is aligned relative to the light pick-up openings so that the modulated light is not directly incident upon the light pick-up openings but rather is diffusedly reflected by the first reflector at least once.

The light pick-up device of the present invention can be used in either a drum shaped scanning device or a flat bed scanning device and for picking up modulated light from either an opaque or transparent master or original. In order to enable scanning colored masters, the pick-up device includes means for color separation which is three separate opto-electronic transducers which each have a separate dichroitic filter and each pick-up opening has three separate means such as optical fibers for communicating the modulated light to the separate transducers.

When the pick-up device is used in a drum scanning device, the hollow body has either a spherical shape or is at least symmetrical to the light beam axis. When the device is used in a flat bed scanning device, the hollow body is either a tubular member or is composed of two curved members having circular cross-sections.

When the pick-up is used for collecting light from a transparent master, the hollow body needs only a single light entrance opening to receive the modulated light. This opening may be covered with a diffusing member such as a lens or scattering medium which will also prevent dirt from entering the hollow body. To prevent the entry of dirt into the hollow body, the openings may be covered by glass or transparent plates or members.

DESCRIPTION OF THE PREFERRED EMBODIMENTS

Figure 1:
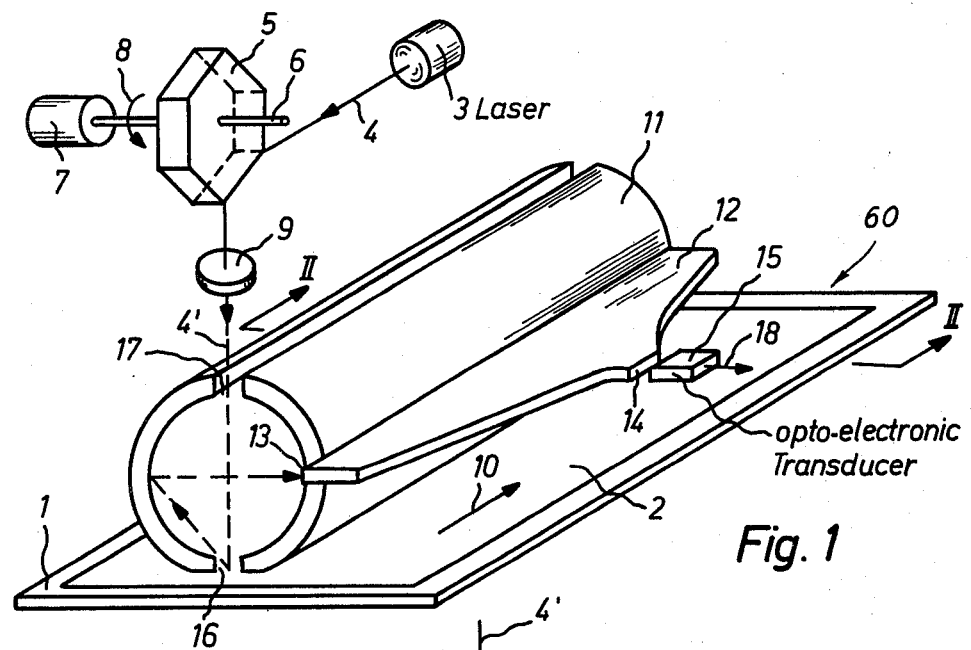
FIG. 1 is a perspective view of a sample embodiment of a light pick-up device of the present invention being used in a flat bed scanning device for opaque masters.

The principles of the present invention are particularly useful when incorporated in a flat bed scanning device for opaque masters which scanning device is generally indicated at 60 in FIG. 1. In the device 60, an opaque original or master 2, which is to be reproduced, is situated on a movable flat bed master holder or carrier 1. A light source 3, which for example may be a laser light generator, generates a light beam 4, which strikes a polyhedral mirror 5, which rotates on an axis of rotation 6 that, is aligned perpendicularly relative to the axis of the light beam 4. A motor 7 drives thd polyhedral mirror 5 with a constant angular velocity in the direction of an arrow 8. As a result of the rotation of the polyhedral mirror 5, the light beam 4 proceeding from the light source 3 is reflected by the individual mirror surfaces to form beam 4' which is subject to continuous excursion or deflection through a lens 9 along a line onto the opaque master 2 in a direction 10, which is a scanning direction. At the same time, the flat bed master holder 1 executes a step-by-step or continuous forward feed motion perpendicular to the direction 10 so that the opaque master 2 is scanned point-by-point in lines lying next to one another.

A stationary light pick-up device 11 is disposed over the movable flat bed master 1, and the light pick-up device 11 extends along the direction 10 at least over the length of the flat bed master holder 1 and the length of the line of deflection for the beam 4'. The light pick-up device 11 is designed as a hollow body whose inside surface reflects. At approximately right angles relative to the deflection plane of the light beam 4' which is reflected by the rotating polyhedral mirror 5, the light pick-up device 11 has a slot-shaped light aperture oriented in the direction 10, and the light opening, in the sample embodiment, is filled up by an end surface of an optical shape converter 12 which exhibits the greater expanse and which forms a light pick-up surface 13 of the light pick-up device 11. The optical shape converter 12 is constructed of a multitude of optical fibers and has a surface 14 with a smaller expanse which is coupled to an opto-electronic transducer 15, which for example may be a photomultiplier. The light pick-up device 11 also has a pair of a slot shaped light entry openings 16 and 17 oriented in the direction 10. The second or outer opening 17 of this pair is at the side facing away from the opaque master 2 and the first slot-shaped light passage or opening 16 is at the side facing the opaque master 2. The scanning light beam 4' passes through both openings 17 and 16 and proceeds to the opaque master 2. The scanning light beam, which is modulated with the image content of the opaque master 2, is reflected back through the light passage or opening 16 into the light pick-up device 11 and is reflected by the inside surface into the light pick-up surface 13 to be transported by the optical shape converter 12 to the opto-electronic transducer 15 which converts the light into an image signal that is placed on a line 18. The precise beam path, which is only schematically indicated in FIG. 1 by an arrow, is described in detail in FIG. 2.

Figure 2:
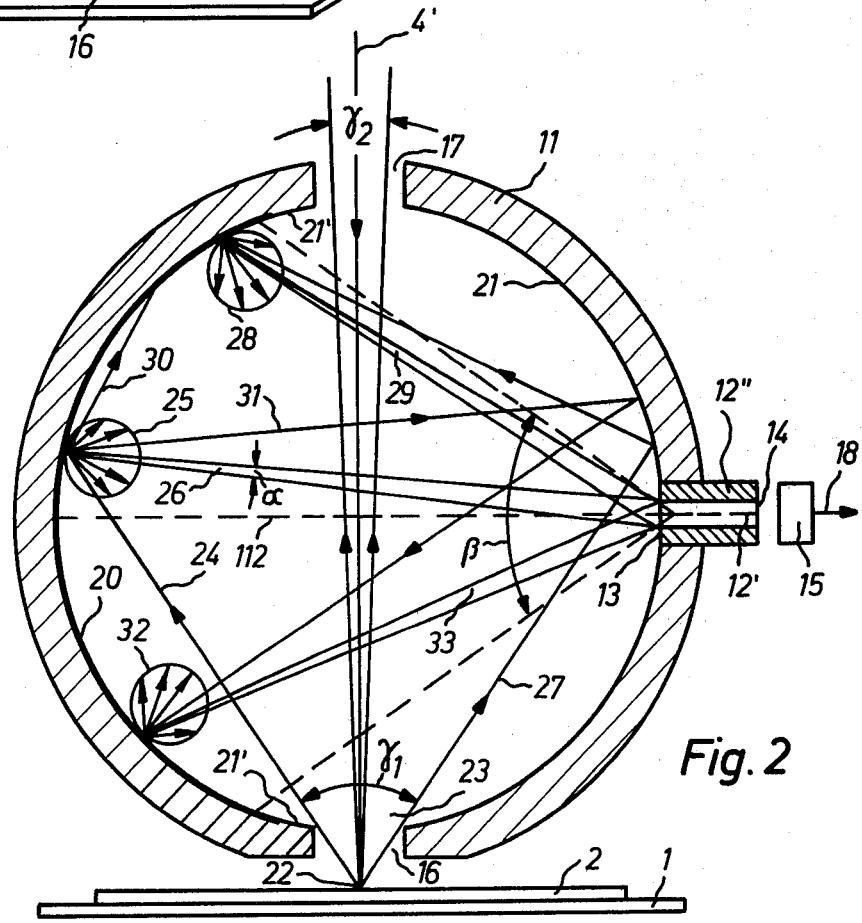
FIG. 2 is a cross-sectional view of the light pick-up device for opaque masters taken on line II—II of FIG. 1.

FIG. 2 besides showing the cross-section of the light entry openings 16 and 17 also show an optical fiber 12' and its cladding 12" of the optical shape converter 12. The light pick-up surface 13 is formed by the end face of the optical fiber 12' which exhibits the optical axis 112 and has an aperture angle $\beta$. Thus, the only light carried through the optical fiber is that light which is incident on the end face 13 at the aperture angle $\beta$.

At least in the area which is limited by the aperture angle $\beta$ of the optical fiber 12', the inside surface of the light pick-up device 11 lying opposite the light pick-up surface 13 is designed as a first reflector 20 which diffusedly reflects. The remaining inside surface consists of mirror reflectors or mirrors 21 and 21'. However, the entire inside surface could also be diffusely reflective reflectors.

The shape and spacing of the first reflector 20 are selected in such manner that as large a component as possible of the light diffusely reflected by it is incident upon the light pick-up surface 13 within the aperture angle $\beta$. The diffuse light coming from the reflector 20 which is not directly incident upon the light pick-up surface 13 is guided or reflected back to the reflector 20 nearly loss-free by the mirrors 21 and 21' and is again diffusely reflected.

The light pick-up surface 13 and first light passage or opening 16 are disposed relative to one another in such a manner that no scanning light coming from the opaque master 2 will proceed directly into the light pick-up surface 13. All the light received by surface 13 is diffusely reflected at least once by the reflector 20.

The light entry opening 17 is expediently selected to be of such a size that the unmodulated scanning light beam, which is reflected back from a shiny master surface, emerges directly from the light entry opening 17 and remains out of consideration.

The spacing of the first light passage or opening 16 relative to the opaque master 2 and the size of the light opening 16 are expediently selected as follows. Given image originals, the spacing is small, as a result of which as much as possible of the modulated light, which proceeds from all reflection directions of the opaque master 2, will enter into the light pick-up device 11. The size of the light opening 16 is likewise small so that the disruptive influence of the opaque master 2, which itself participates in the reflections within the light pick-up device 11 in the area of the light opening 16, is slight.

In contrast thereto, the spacing is selected larger for given line originals and paste-up montages so that, in particular, the thicker paste-up montages can pass unimpeded in the narrow gap between the light pick-up device 11 and the opaque master 2. The size of the light passage or opening 16 is selected correspondingly larger so that as much as possible of the modulated light can proceed from all reflection directions of the opaque master 2 into the light pick up device 11 even given the greater spacing.

A few characteristic beam paths are illustrated in FIG. 2 for the purpose of further explanation.

The scanning light beam 4' is directed through the light entry opening 17 and the light passage or opening 16 onto the opaque master 2 attached to the flat bed master carrier 1. The light beam 4' is modulated on the opaque master 2 by the image content of the momentary scanning point 22 and is diffusely reflected back from the scanning point 22 into the light pick-up device 11 through the light passage opening 16 as a modulated light beam 23 with marginal rays 24 and 27 that diverge with the aperture angle $\gamma_1$. The marginal ray 24 of the modulated light beam 23 is directly incident upon the reflector 20 and is resolved or reflected into scattered light 25 with the illustrated intensity distribution (intensity=length of arrows). The scattered light 25 has a scattered light beam 26 which diverges with the angle $\alpha$ and is incident upon the light pick-up surface 13. The marginal ray 27 of the modulated light beam 23 does not incident upon the light pick-up surface 13 but, rather, is reflected or conducted by the mirrors 21 onto the reflector 20 and is likewise resolved or reflected into scattered light 28 which has a divergent scattered light beam 29 that is directly reflected onto the light pick-up surface 13. The scattered light, which is not incident upon the light pick-up surface 13, again strikes the reflector 20 either directly or after being reflected by the mirrors 2 and 21'. For example, the scattered beam 30 is directly incident upon the reflector 20, whereas the scattered beam 31 is incident upon the reflector 20 after being reflected by the mirror 21. Thus, the beam 31 when it reaches the reflector 20 is again resolved into scattered light 32 which has a scattered light beam 33 that strikes upon the light pick-up surface 13.

That part of the modulated light beam 23, which derives from a mirror reflection on the opaque master 2, is reflected with the smaller aperture angle $\gamma_2$ and leaves the light pick-up device 11 through the light entry opening 17 and has no effect.

When the scattered light beams which is directed upon the light pick-up surface 13 respectively coincide with the principal directions of the scattered light (scattered light with the highest intensity), then an optimum efficiency of the light pick-up device 11 will occur. This condition occurs when the reflector 20 and the mirrors 21' are part of a circle whose center is on the surface 13 and on the surface normal 112 (optical axis) of the light pick-up surface 13 and when the mirrors 21 are a part of a second circle of the same size whose center is at the point of intersection of the optical axis 112 with the reflector 20. For the sake of simplicity, however, the sample embodiment utilizes a circular cross-section which is obtained by a slotted tubular member that is used as the body for the device 11.

The inventive light pick-up device 11 has the following advantages. As a result of the described disposition of reflector 20 and mirrors 21 and 21', a large proportion of the modulated light reflected by the opaque master 2 proceeds to the light pick-up surface 13 and, over the shape converter 12, to the opto-electronic transducer 15. Thus, the light pick-up device 11 has a high efficiency so that the light source 3 generating the scanning light beam 4 can use a lower power.

As a result of the large proportion of modulated light which proceeds to the opto-electronic transducer and as a result of the diffuse reflection at the reflector 20, the full aperture angle $\beta$ of the optical fiber 12' is exploited and the disruptive influence of scratches and shadow edges in the master is suppressed. Thus, a high reproduction quality is achieved.

Figure 3:
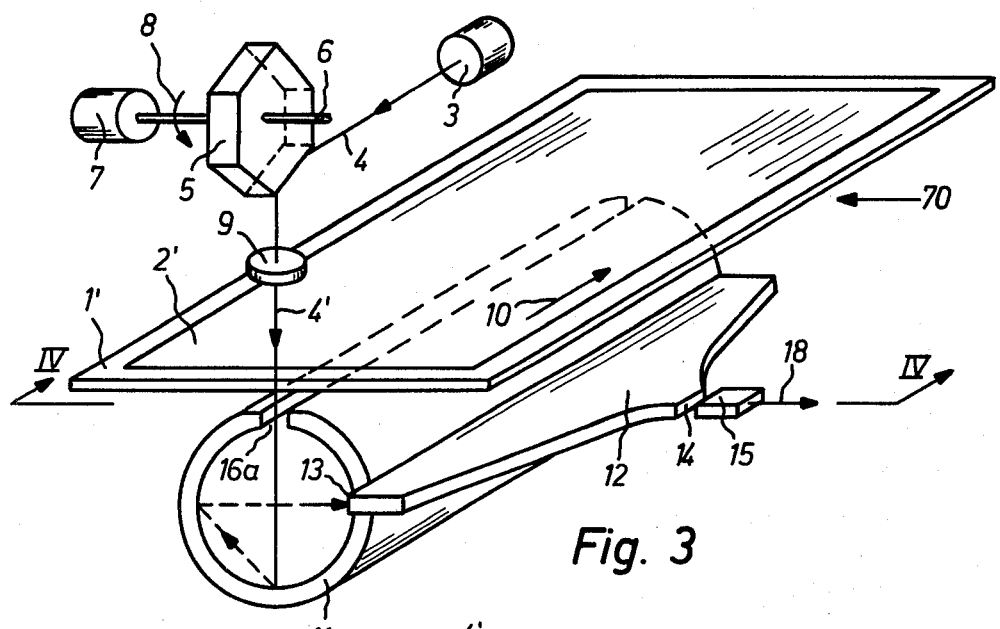
FIG. 3 is a perspective view of another embodiment of a light pick-up device used in a flat bed scanning device for transparency masters.

A flat bed scanning device for transparent masters is illustrated in FIG. 3 and is generally indicated at 70. In the device 70, a transparent master 2' is situated on a movable flat bed scanning support or carrier 1' which is transparent. A stationary light pick-up device 11a, which has been modified in comparison to the embodiment illustrated in FIG. 1, is disposed below the flat bed scanning support 1'. The light pick-up device 11a likewise extends at least over the length of the flat bed scanning support 1' in the direction 10. The modified light pick-up device 11a has a slot-shaped light entry opening 16a only on its side facing the transparent master 2'. The light beam 4' is deflected point-by-point and line-by-line over the master 2' by the rotating polyhedral mirror 5. The scanning light beam 4' passes through the transparent master 2', the flat bed master holder 1' and the light entry opening 16a into the light pick-up device 11a. The scanning light is again reflected by the inside surface of the light pick-up device 11a to the light pick-up surface 13 and is conveyed by the optical shape converter 12 to the opto-electronic transducer 15, which converts it into an image signal.

In a master scanning device for optional opaque and transparency scanning, the light pick-up device can preferably be constructed so as to be vertically displaceable relative to the flat bed scanning support 1 or 1' so that the light pick-up device, depending on the type of master, is situated above or below the flat bed scanning support in accord with FIGS. 1 or 3. Thus, one of the slot-shaped light passage openings 16 or 17 according to FIG. 1 is designed so as to be closeable by means of suitable member in the case of a transparency scanning.

However, alternatively thereto, the master scanning devices can also be equipped with both a light pick-up device for opaque scanning and one for transparency scanning which are activated depending upon the type of master. In transparency scanning, the presence of two light pick-up devices has the particular advantage that both light pick-up devices can be connected in parallel either optically or electrically for the purpose of eliminating the image signal disruptions due to dust particles, scratches, etc. In the case of an optical parallel connection, the light exit surfaces of the optical shape converters of both light pick-up devices are coupled to an opto-electronic transducer, and for an electrical parallel connection, the outputs of the opto-electronic transducers are combined.

Figure 4:
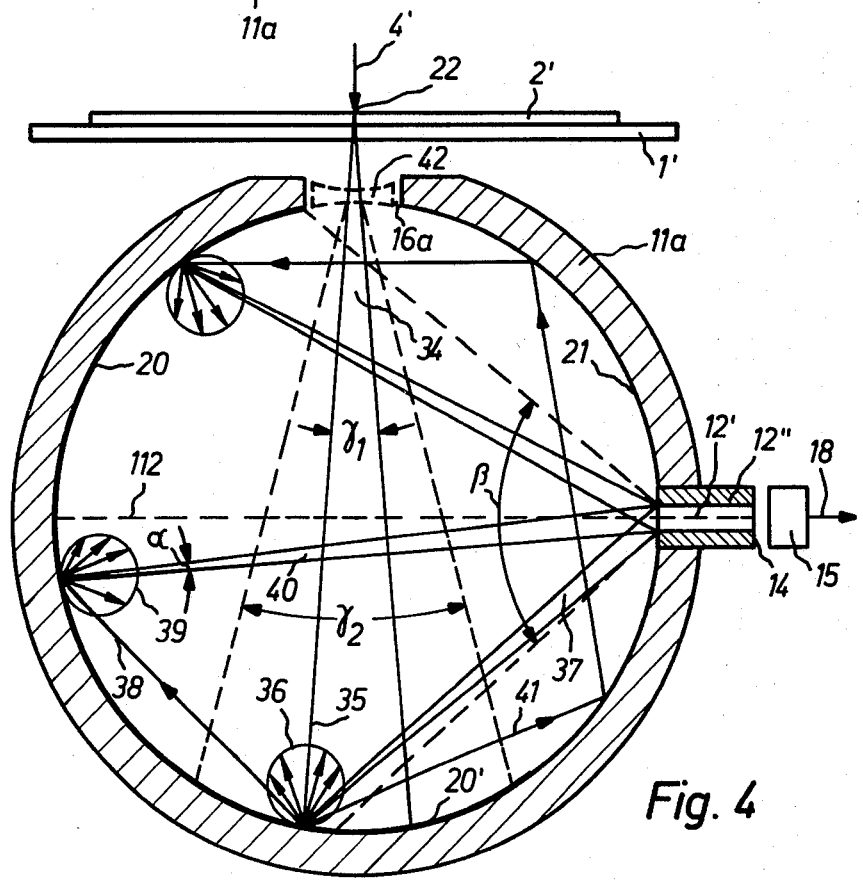
FIG. 4 is a cross-sectional view of the light pick-up device for transparency masters taken on line IV—IV of FIG. 3.

The modified light pick-up device 11a is illustrated in greater detail in FIG. 4. In comparison to the light pick-up device 11, the device 11a exhibits a diffuse reflector 20 which has been enlarged by the part 20'.

The scanning light beam 4' is incident upon the transparency master 2' and is modulated with the image content in the scanning point 22. The modulated light proceeds into the light pick-up device 11a through the light entry opening 16a as a divergent modulated light beam 34 with the aperture angle $\gamma_1$. The diffusing reflector 20 resolves or reflects a marginal ray 35 of the modulated light beam 34 into scattered light 36 which has a scattered light beam 37 that diverges with the angle $\alpha$ and is directly incident upon the light pick-up surface 13. A scattered beam 38 of the scattered light 36 is incident upon the diffuse reflector 20 and is again reflected or resolved into scattered light 39 which has a scattered light beam 40 that directly proceeds into the light pick-up surface 13. In contrast thereto, a scattered beam 41 of the scattered light 36 is reflected twice by the mirror 21 before reaching the diffusing reflector 20 for a second time.

A glass plate, a diffusing screen or a lens, which protects the inside space of the light pick-up device 11a against the intrusion of dust, is preferably disposed in the light entry opening 16a. The employment of a scattering medium has the additional advantage that the aperture angle $\gamma_1$ of the modulated light beam 34 is enlarged to the aperture angle $\gamma_2$. By enlarging the modulated beam, a larger part of the inside surface of the device 11a participates in the reflections and the light pick-up device is made mre insensitive to dust particles situated in the inside space. A divergent lens 42 can be provided in the light entry opening 16a in FIG. 4 for this same purpose. It of course lies within the framework of the invention that a multitude of photodiodes, photomultipliers or of some other opto-electronic transducers are disposed in the light pick-up surface 15 instead of the optical shape converter.

The embodiments of the light pick-up device described up to now with the sectional views according to FIGS. 2 or 4 are designed for flat bed scanning devices and are designed in such a manner that they extend at least over the length of the flat bed scanning support, as illustrated in FIGS. 1 and 3. However, the light pick-up device can also advantageously be employed in drum scanning devices. In this case, the light pick-up device 11b is designed, for example, as a hollow sphere with the cross-section according to FIGS. 2 or 4. The light pick-up surface 13 is no longer slot-shaped, as illustrated in FIGS. 1 and 3, but is circularly or quadratically designed. The shape converter 12 is omitted and the opto-electronic transducer 15 is directly disposed in the light pick-up surface 13 or is connected by at least one optical fiber.

Figure 5:
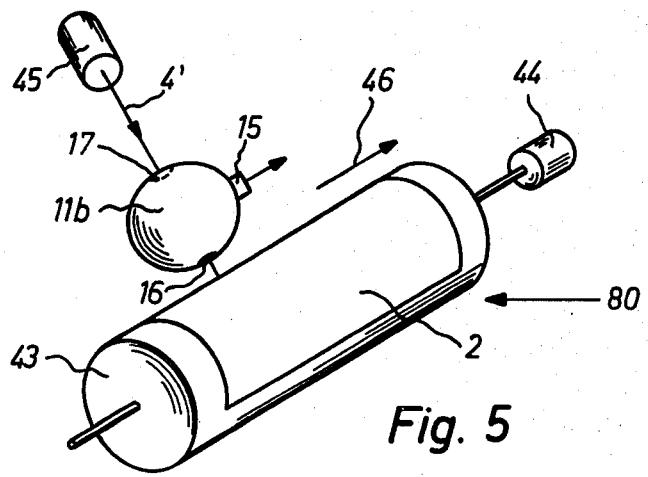
FIG. 5 is a perspective view of a sample embodiment of a light pick-up device of the present invention used in a drum scanning device for opaque masters.

A sample embodiment of a light pick-up device 11b is illustrated in FIG. 5 as being used in a drum scanning device for opaque masters which scanning device is generally indicated at 80.

The opaque master 2 to be reproduced is attached to a scanning drum 43 which is driven by a motor 44 of the device 80. A light source 45 and the spherical light pick-up device 11b move past the scanning drum 43 in the same direction along a direction of an arrow 46. The light beam 4' proceeding from the light source 45 is directed through the light entry opening 17 and the light passage or opening 16 of the light pick-up device 11b onto the opaque master 2. The scanning light is reflected back by the opaque master 2 through the light passage or opening 16 into the light pick-up device 11b. The modulated light in the device 11b is reflected by the inside surfaces of the light pick-up device either onto the opto-electronic transducer 15 which converts the light into the image signal or onto an optical waveguide which is coupled to the transducer.

In a drum scanning device for transparency masters, a spherical light pick-up device with the cross-section according to FIG. 4 can be disposed within the scanning drum to receive the modulated light.

The explanations provided in the case of the flat bed scanning devices apply by analogy to optional opaque or transparency scanning.

The spherical light pick-up device 11b according to FIG. 5 can also be advantageously employed in a flat bed scanning device if the flat bed scanning support is stationary. Thus, the light source and light pick-up device must move back and forth over the flat bed scanning support for point-by-point and line-by-line scanning of the master.

Figure 6:
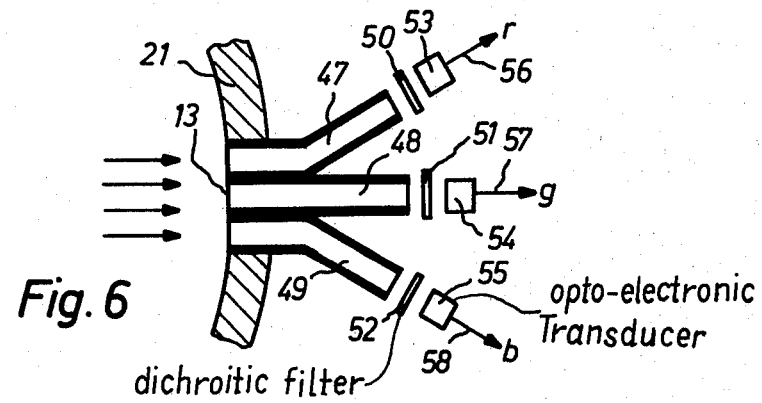
FIG. 6 is a partial cross-section of the light pick-up devices for color scanning devices.

An advantageous development of the inventive light pick-up device in scanning devices for color masters is illustrated in FIG. 6 which shows a partial sectional view of a light pick-up device according to FIGS. 2 or 4. FIG. 6 illustrates the light pick-up surface 13 with a part of the mirror 21 to provide means for color separation. At least three optical fibers 47, 48 and 49 are disposed above one another in the plane of the drawing and the light entry surfaces of these optical fibers forming the light pick-up surface 13 of the light pick-up device. In a tubular light pick-up device for flat bed scanning, the optical fibers 47, 48 and 49 are, for example, a component of the shape converter and in a spherical light pick-up device for drum scanning, on the other hand, they are at least three separate optical fibers or optical fiber bundles. For the purpose of the color separation of the scanning light, the light exit surfaces of the optical fibers 47, 48 and 49 are connected through three dichroitic filters 50, 51 and 52 to three opto-electronic transducers 53, 54 and 55 which supply the three measured color value signals r, g and b onto lines 56, 57 and 58.

Figure 7:
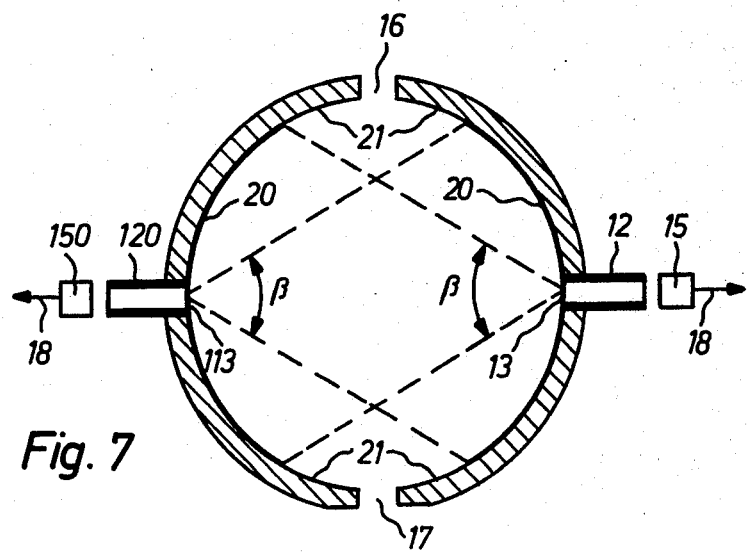
FIG. 7 is a cross-sectional view similar to FIG. 2 of a further embodiment of the present invention.

In the previously described embodiments, a single point or line or strip of the light pick-up surface was utilized. In the embodiment of FIG. 7, a second light pick-up surface 113 is positioned opposite the light pick-up surface 13 and also has an aperture angle $\beta$. The inside surfaces which lying opposite one another in the area of the aperture angles $\beta$ of the surface 13 and 113 are designed as reflectors 20 that are diffusely reflective and the remaining inside surfaces are designed as mirrors 21. Such a light pick-up device can again be advantageously employed for the elimination of image signal disruptions due to dust particles, shadow edges or scratches.

In the selected sample embodiment, the opto-electrical transducer 15 is coupled to the optical fibers of the converter 12 and the surface 113 is coupled to the optical fibers of a converter 120 that extends to a second opto-electronic transducer 150. In this case, the transducers 15 and 150 are electrically connected in parallel in order to eliminate image signal disruptions. Alternatively thereto, the optical fibers of connectors 12 and 120 can again be optically connected in parallel and be coupled to a common transducer.

Although various minor modifications may be suggested by those versed in the art, it should be understood that I wish to embody within the scope of the patent granted hereon, all such modifications as reasonably and properly come within the scope of my contribution to the art.

I claim:

1. In a scanning device for point-by-point and line-by-line opto-electronic scanning of an information bearing master mounted on a flat bed carrier for supporting said master, said device including means for projecting a scanning light beam along a line on the master, which light beam is modulated by the information of the master to form mudulated light, a light pickup device for collecting the modulated light from the scanned master and opto-electronic transducer means for converting said collected modulated light into image signals, said light pickup device consisting of an elongated hollow body having an inside reflective surface, a slot-shaped light entrance opening extending parallel and at least the length of the line and facing the master for receiving the modulated light, and said pickup device having a light pickup area for receiving the modulated light collected by said hollow body, the improvement comprising:
  (a) the light pickup area including at least one light pickup opening having a slot shape of substantially the length of the entrance opening and extending parallel thereto, a slot-shaped light entrance face of an optical-shaped converter having a light exit face being coupled to said opto-electronic transducer, said light entrance face having an aperture angle $\beta$ and filling the light pickup opening;
  (b) the reflective surface of the hollow body lying opposite the light entrance face at least in the area covered by the aperture angle $\beta$ of the light entrance face being a diffused reflector and the reflective surface of the hollow body lying adjacent the light entrance face being a second reflector;
  (c) said diffused reflector being shaped in such a manner and being aligned to the light entrance face so that a large portion of the modulated light is converted by said diffused reflector into diffused light and reflected onto the light entrance face;
  (d) said diffused reflector and said second reflector being disposed to one another in such a manner that the portion of diffused light not reflected onto the light entrance face and the portion of modulated light striking the second reflector are reflected by said second reflector to the diffused reflector and converted into diffused light; and
  (e) the light pickup opening being positioned in the hollow body relative to the light entrance opening so that the modulated light does not directly strike on the light entrance face but rather is converted into diffused light by said diffused reflector before being received by the light entrance face.

2. In a scanning device according to claim 1, which includes a second light pickup opening disposed opposite of the first-mentioned light pickup opening, said second light pickup opening having the shape of the first light pickup opening and being filled by a light entrance face of a second optical shape converter connected to a second opto-electronic transducer and wherein the second reflector is a diffusedly reflecting reflector.

3. In a scanning device accpording to claim 1, wherein the second reflector is a mirror reflector.

4. In a scanning device according to claim 3, wherein the hollow body has a cross-section in a plane extending perpendicular to the light entrance face with the diffused reflector being part of a first circle whose center lies on the base of the surface normal of said light entrance face and the second reflector being part of a second circle of identical size to the first circle, said second circle having its center at a point of intersection of the surface normal with the diffused reflector.

5. In a scanning device according to claim 3, wherein the hollow body is a tubular member having an elongated slot forming the light entrance opening.

6. In a scanning device according to claim 3, wherein the light entrance opening is close by a glass plate.

7. In a scanning device according to claim 3, wherein the light entrance opening is closed by a scattering medium.

8. In a scanning device according to claim 3, which includes means for color separation to enable optical scanning of colored masters, said means for color separation including at least three opto-electronic transducers each having a separate dichroitic filter, and said light pickup opening having three separate means for conducting light to the three transducers and filters.

9. In a scanning device according to claim 3, wherein the hollow body has a slot-shaped second light entrance opening opposite to said first-mentioned light entrance opening and aligned therewith, said means for projecting the scanning light beam directing said light beam through said second and then the first light entrance openings for scanning opaque masters.

10. In a scanning device according to claim 9, wherein the second light entrance opening is selected to be of such a size that the portion of the scanning light beam which is directly reflected as a specular reflection from the master into said hollow body emerges from the hollow body through the second light entrance opening and is not collected by said hollow body.

11. In a scanning device according to claim 9, wherein the second light entrance opening is closable to enable utilizing the light pickup device for scanning transparent masters.

12. In a scanning device for point-by-point and line-by-line opto-electronic scanning of an information bearing master mounted on a drum-shaped carrier for supporting said master, said device including means for projecting a scanning light beam on the master, which light beam is modulated by the information of said master to form modulated light, a light pickup device for collecting the modulated light from the scanned master and opto-electronic transducer means for converting said collected modulated light into image signals, said light pickup device consisting of a hollow body having an inside reflective surface, a light entrance opening facing the master for receiving the modulated light and having a light pickup area for receiving the modulated light collected by said hollow body, the improvement comprising:

(a) the hollow body being symmetrically-shaped relative to the optical axis of the scanning light beam;

(b) the light pickup area being formed by at least one light pickup opening in the hollow body receiving a light entrance face of an optical-shaped converter having a light exit face being coupled to said opto-electronic transducer, said light entrance face having an aperture angle $\beta$ and filling the pickup opening;

(c) the reflective surface of the hollow body lying opposite the light entrance face at least in the area covered by the aperture angle $\beta$ of the light entrance face being a diffused reflector and the reflective surface of the hollow body lying adjacent the light entrance face being a mirror reflector;

(d) said diffused reflector being shaped in such a manner and being aligned to the light entrance face so that a large portion of the modulated light is converted by said diffused reflector into diffused light and reflected onto the light entrance face;

(e) said diffused reflector and said mirror reflector being disposed to one another in such a manner that the portion of diffused light not reflected onto the light entrance face and the portion of modulated light striking the mirror reflector are reflected by said mirror reflector to the diffused reflector and converted into diffused light; and (f) the light pickup opening being positioned in the hollow body shaped in such a manner relative to the light entrance opening so that the modulated light does not directly strike the light entrance face but rather is converted into diffused light by said diffused reflector before being received by the light entrance face.

13. In a scanning device according to claim 12, wherein the hollow body has a cross-section with the diffused reflector being part of a first circle whose center lies on the base of the surface normal of said light entrance face and the mirror reflector being part of a second circle of identical size to the first circle, said second circle having its center at a point of intersection of the surface normal with the diffused reflector.

14. In a scanning device according to claim 12, wherein the hollow body is a hollow sphere.

15. In a scanning device according to claim 12, wherein the light entrance opening is closed by a glass plate.

16. In a scanning device according to claim 12, wherein the entrance opening is closed by a scattering medium.

17. In a scanning device according to claim 12, wherein the hollow body having a second light entrance opening opposite to the first-mentioned light entrance opening and aligned therewith, said means for projecting the scanning light beam directing said light beam through said second light entrance opening and then the first entrance opening for scanning opaque masters.

18. In a scanning device according to claim 17, wherein the second light entrance opening is selected to be of such a size that the portion of the scanning light beam which is directly reflected as a specular reflection from the master into said hollow body emerges from the hollow body through the second light entrance opening and is not collected by said hollow body.

19. In a scanning device according to claim 17, wherein the second light entrance opening is closable to enable utilizing the light pickup device for scanning transparent masters.

20. In a scanning device for point-by-point and line-by-line opto-electronic scanning of an information bearing colored master mountd on a carrier for supporting said master, said device including means for projecting a scanning light beam on the master, which light beam is modulated by the information of the colored master to form modulated light, a light pickup device for collecting the modulated light from the scanned colored master and at least three separate opto-electronic transducers with each transducer having a specific dichroitic filter for separating the colors and generating color signals, said light pickup device consisting of a hollow body having an inside reflective surface, a light entrance opening facing the colored master for receiving the modulated light and having a light pickup area for receiving the modulated light collected by said hollow body, the improvement comprising:

(a) the light pickup area including a light pickup opening in the hollow body receiving three separate light entrance faces of three separate optical-shaped converters having three light exit faces, the light exit faces of said optical light converter being coupled separately to said dichroitic filters and said opto-electronic transducers, said light entrance faces having an aperture angle $\beta$ and filling the light pickup opening;

(b) the reflective surface of the hollow body lying opposite the light entrance face at least in the area covered by the aperture angle being a diffused reflector and the reflective surface of the hollow body lying adjacent the light entrance faces being a mirror reflector;

(c) said diffused reflector being shaped in such a manner and being aligned to the light entrance face so that a large portion of the modulated light is converted by said diffused reflector into diffused light and reflected onto the light entrance faces;

(d) said diffused reflector and said mirror reflector being disposed to one another in such a manner that the portion of diffused light not reflected onto the light entrance faces and the portion of modulated light directly striking the mirror reflector are reflected by said mirror reflector to the diffused reflector and converted into diffused light; and (e) the light pickup opening being positioned in the hollow body relative to the light entrance opening so that the modulated light does not directly strike the light entrance faces but is converted into diffused light by said diffused reflector before being received by said entrance faces.

21. In a scanning device according to claim 20, wherein the hollow body has a cross-section in a plane extending perpendicular to the light entrance faces with the diffused reflector being part of a first circle whose center lies on the base of the surface normal of said light entrance faces and the mirror reflector being part of a second circle of identical size to the first circle, said second circle having its center at a point of intersection of the surface normal with the diffused reflector.

22. In a scanning device according to claim 20, wherein the light entrance opening is closed by a glass plate.

23. In a scanning device according to claim 20, wherein the light entrance opening is closed by sa scattering medium.

24. In a scanning device according to claim 20, wherein the light pickup device is used in a flat bed scanner having a flat bed carrier for supporting the colored master in a plane, wherein the hollow body has a substantially cylindrical shape and is orientated to extend parallel to the line and wherein the light entrance opening and the light pickup opening are slot-shaped and extend parallel to the line for the length of the line.

25. In a scanning device according to claim 24, wherein the hollow body is a tubular member.

26. In a scanning device according to claim 20, wherein the light pickup device is used in a drum scanner having a drum-shaped carrier for supporting said colored master and wherein the hollow body is symmetrically-shaped relative to the optical axis of the scanning light beam.

27. In a scanning device according to claim 26, wherein the hollow body is a hollow sphere.

28. In a scanning device according to claim 20, wherein the hollow body has a second light entrance opening opposite to said first-mentioned entrance opening and aligned therewith, said means for projecting the scanning light beam directing said light beam through said second light entrance opening and then the first entrance opening for scanning opaque masters.

29. In a scanning device according to claim 28, wherein the second light entrance opening is selected to be of such a size that the portion of the scanning light beam which is directly reflected on a specular reflection from the master into said hollow body emerges from the hollow body through the second light entrance opening and is not collected by said hollow body.

30. In a scanning device according to claim 28, wherein the second light entrance opening is closable to enable utilizing the light pickup device for scanning transparent masters.

* * * * *